(12) United States Patent
Vasey (10) Patent No.: US 7,506,251 B2
(45) Date of Patent: Mar. 17, 2009

(54) CROSS-REFERENCE GENERATION

(75) Inventor: Philip E. Vasey, Histon (GB)

(73) Assignee: Business Intergity Limited (GB)

( * ) Notice: Subject to any disclaimer, the term of this patent is extended or adjusted under 35 U.S.C. 154(b) by 531 days.

(21) Appl. No.: 10/932,017

(22) Filed: Sep. 2, 2004

(65) Prior Publication Data

US 2005/0050444 A1 Mar. 3, 2005

Related U.S. Application Data (60) Provisional application No. 60/499,381, filed on Sep. 3, 2003.

(51) Int. Cl.
*G06F 17/00* (2006.01)
(52) U.S. Cl. .................. 715/255; 715/256; 715/209; 715/234
(58) Field of Classification Search ............ 715/513, 715/500, 517, 505, 515, 234, 205, 256, 266, 715/208, 255, 209; 706/46; 707/100
See application file for complete search history.

(56) References Cited

U.S. PATENT DOCUMENTS

| | | | |
|---|---|---|---|
| 5,552,982 A * | 9/1996 | Jackson et al. ............... | 715/531 |
| 5,893,914 A * | 4/1999 | Clapp ......................... | 715/507 |
| 6,182,095 B1 * | 1/2001 | Leymaster et al. .......... | 715/515 |
| 6,295,542 B1 * | 9/2001 | Corbin ..................... | 715/501.1 |
| 2003/0172343 A1 * | 9/2003 | Leymaster et al. .......... | 715/500 |

FOREIGN PATENT DOCUMENTS

| EP | 1329817 A1 | 7/2003 |
|---|---|---|
| GB | 2 336 012 | 10/1999 |

OTHER PUBLICATIONS

Microsoft Word 2000 (herein Word), pp. 1-14, copyright 1999.*
Les Bonser, Internet Article, Online! Oct. 20, 1996,Retrieved from the internet.

* cited by examiner

*Primary Examiner*—Thu Huynh
(74) *Attorney, Agent, or Firm*—Anderson Gorecki & Manaras LLP (57) ABSTRACT

The invention provides a document generation system, which is capable of generating a fully or a partially customized document by evaluating rules to select some of a group of content elements, such that the fully or partially customized document is able to support cross-references between a first content element and at least a second content element, and cross-references between any of the content elements and an external file.

43 Claims, 7 Drawing Sheets

| Prompt | Input | Defer | Unsure |
|---|---|---|---|
| Select the jurisdiction | ☑ England and Wales<br>☐ Scotland<br>☑ Japan | | ☑ |
| Select the Japanese court | ● Tokyo<br>○ Kyoto | | ■ |

Figure 1a

| | |
|---|---|
| Jurisdiction IS "England and Wales" | Indefinite |
| Jurisdiction IS "Scotland" | False |
| Jurisdiction IS "Japan" | Indefinite |
| JapaneseCourt IS "Tokyo" | False |
| JapaneseCourt IS "Kyoto" | True |

LAW
[¹This Agreement shall be governed in all respects by the Laws of England and Wales. The parties hereto agree that any suit, action or proceeding in relation to any claims, dispute or difference which may arise under this Agreement shall be brought in the High Court of London, and irrevocably and unconditionally submit to the non-exclusive jurisdiction of the High Court of London.₁]
[²This Agreement shall be governed in all respects by Japanese Law. The parties hereto agree that any suit, action or proceeding in relation to any claims, dispute or difference which may arise under this Agreement shall be brought in the High Court of London, and irrevocably and unconditionally submit to the non-exclusive jurisdiction of the Kyoto District Court.₂]

¹ Jurisdiction IS "England and Wales"
² Jurisdiction IS "Japan"

6.  Termination

6.1  This termination clause is used when the jurisdiction is England and Wales.

| TERMINATION_JURSIDICTION |

6.2  This termination clause is used when the jurisdiction is Scotland.

| TERMINATION_JURSIDICTION |

...

subject to the provisions of clause | TERMINATION_JURSIDICTION |

CROSS-REFERENCE GENERATION

RELATED U.S. APPLICATIONS

This application claims the benefit of U.S. provisional application no. 60/499,381, filed 3 Sep. 2003.

FIELD OF THE INVENTION

The present invention relates to the automated creation of documents, and in particular, to the creation of cross-references within such documents.

BACKGROUND TO THE INVENTION

It is well known to generate customised documents, either manually or using an automated system, from precedents or templates.

If this is done manually, then a printed standard form or other precedent, containing blank spaces for particular relevant information, will be filled in and edited on each specific occasion it is used. Instructions may be included in the standard document to help the user insert the correct or appropriate information.

If this is done using an automated system, then an electronically stored document or template will be used, in conjunction with various logical rules and other criteria, to prompt the user for the correct information and to assemble a customised document by associating various relevant rules with variables within the template. An example is the HotDocs® system which uses a library of Form Templates, which store both static and dynamic areas of text, that are initially customised by the user, in conjunction with a questionnaire to produce a completed customised document. Necessary information relevant to the dynamic text areas may either be input directly by a user, or gathered from an Answer File. The Answer File contains information which is repeatedly used in the same or similar customised document. Various logical rules and calculation criteria are used to associate information with the template to produce a final customised document. This document may then be edited, printed or stored.

Other known automated systems include that described in WO01/04772. In this system, a server computer runs a document generation program and is capable of communicating with local or remote client computers over a local area network (LAN) or a wide area network (WAN), such as the internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

Both of these automated methods produce documents in known word processing formats, such as Microsoft Word. These final documents are static. However, the nature of production of the final document means that it is not possible for it to contain all of the formatting features allowed by the word processing package. For example, in a statically generated document, it is possible to include clause or paragraph numbering, as well as cross-references. This is relatively easy to achieve: Microsoft Word offers auto-numbering mechanisms, which can apply clause or paragraph numberings in a variety of formats. These mechanisms adjust the number of successive clauses or paragraphs when text is deleted, automatically. It is also possible to have a tiered numbering system, reflecting sub-clauses and sub-paragraphs.

It is also possible to include cross-references between clauses and paragraphs, again using an automatic mechanism within the Microsoft Word software. If the cross-references contain numbers, relating to particular clauses or paragraphs, and a clause is deleted, then the cross-reference is able to adjust to take this into account.

Ideally, therefore, it would be extremely useful for the final documents of the automated generation methods discussed above to contain these static features. However, at present, this is not possible.

For example, the automated methods above are able to associate conditional text and logical rules in order to produce a customised document. However, the auto-numbering mechanism is unable to cope when conditional clauses are removed from a template, which may result in the number sequence of the clause containing duplicates, missing entries or an error code.

A second issue with conditional clauses arises when a cross-reference refers to a clause which is not included in the final document. In this situation, the cross-reference is unresolved in the generated document. The cross-reference is of course resolved in the template on which the final document is based, as this contains all of the necessary conditional clauses.

The inability to cope with the numbering of and cross-referencing to conditional clauses causes particular difficulties in generated documents which require further information for completion. EP1329817 discloses a document generation system in which it is possible to generate a partially customised document, depending upon which rules have been executed based on the supplied information. It also takes into account whether the information provided is certain, unsure or whether the user wishes to defer providing particular information, and adjusts the clauses and information present in the generated document accordingly. This leads to the generation of a partially customised document, as illustrated in FIG. 1.

FIG. 1 illustrates a simple example of how conditional text affects the final document. Suppose that a particular clause in a contract relates to the law by which the contract will be governed and in which jurisdiction the court which will settle any dispute arising from the contract resides.

Figure 1A:
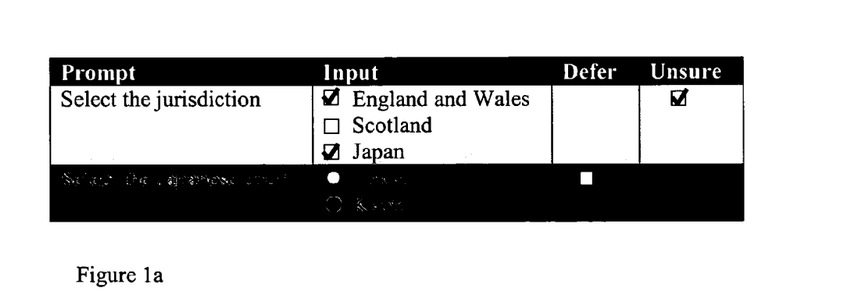
FIG. 1a referred to above shows an example of a prompt in an automated document generation system.

In FIG. 1a, an example of a prompt is shown. This prompt allows the user to select the jurisdiction in which the contract will operate, and accordingly, the law by which it is governed. The options given are England and Wales, Scotland, or Japan. As a subsidiary option, there is a choice of district court in Japan in which any action in relation to the contract can be taken: Tokyo or Kyoto. FIG. 1a shows the situation where the user is unsure whether the jurisdiction will be England and Wales or Japan. Accordingly, given the possibility that the jurisdiction could be Japan, the user has chosen the district court as Kyoto.

Figure 1B:
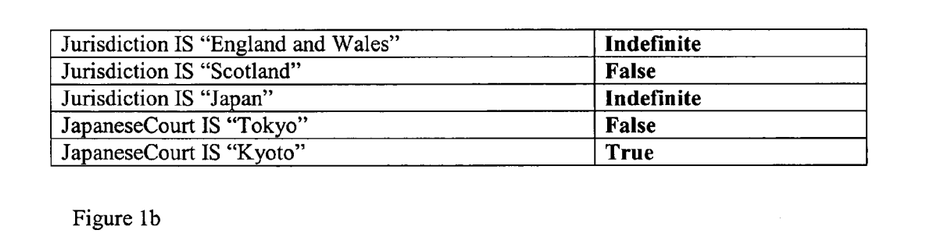
Figure 1C:
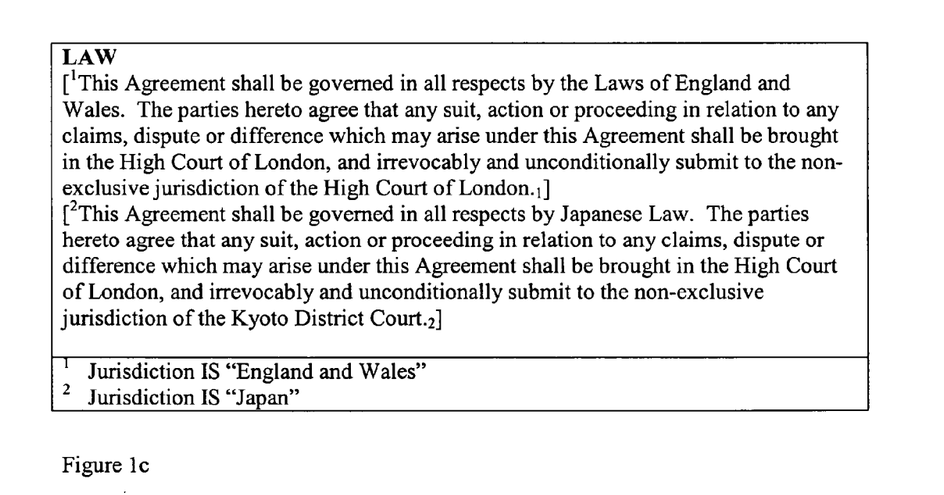

FIG. 1b shows a logic table for the various options shown in the prompt in FIG. 1a. This results in the text shown in FIG. 1c being generated in the customised document. The footnotes show the conditional text. As the customised document still contains conditional text, it is not final. It can itself be used as a further template for collecting information to allow a final customised document to be generated.

Consequently, it would not be possible to include clause reference numbers or cross-references in either the partially customised document or the final document, as any references to conditional text would be unresolved. An additional problem in a partially customised document is that there may be two clauses in the document, each with the same cross-reference. This is unresolvable, since for a cross-reference to function correctly, it must be unique.

A further problem arises when, as an alternative to, or as well as conditional text, the document requires a reference to information contained in an external file. This could be, for example a boilerplate clause. It makes no difference whether the information in the second file is conditional (as above) or unconditional, as neither the template nor the final document will be unable to support a reference to it.

A partial solution to the problem of providing clause references and cross-references within the same document is provided by utilising macros and cross-references provided by Microsoft Word within the template. In order to create cross-references, it would be necessary to subject each cross-reference to the same conditions as the clause to which they refer. However, this would require a great deal of hand encoding, since any change to a clause would require each cross-reference which was governed by the same conditions as that clause to be changed. This would be time consuming and prone to error.

There therefore exists a need to provide a method to produce such partially and fully customised documents which avoids the need for complex hand encoding and re-editing of the template.

SUMMARY OF THE INVENTION

The invention addresses the problems described above. The invention provides a document generation system, which is capable of generating a fully or a partially customised document by evaluating rules to select some of a group of content elements, such that the fully or partially customised document is able to support cross-references between a first content element and at least a second content element, and cross-references between any of the content elements and an external file.

The fully or partially customised document is generated by a document generation program which is stored on a client computer or a server computer. The information necessary to enable the document generation program to generate the fully or partially customised document is received at a client computer. This may be the same computer as that which the document generation program is stored on. Alternatively, if the document generation program is stored on a server computer, the client computer may be connected with the server computer by means of a communication protocol, such as TCP/IP, HTTP or XML.

The cross-references are created in a template which is assembled by the document generation program. The cross-references are marked-up in the form of reference elements and label elements. When the document generation program generates a fully customised document, the document generation program replaces each label element with a bookmark and each reference element with a cross-reference to a bookmark. This is possible as in a fully customised document, all relevant content elements have been evaluated by the rules, and no conditional text exists. Therefore each label element and reference element will be unique, and replaceable with a bookmark or cross-reference. In a partially customised document, the label elements and reference elements are shown as part of the marked-up text.

Embodiments of the invention have the advantage that cross-references to conditional text or text in external files may be included in an automatically generated document.

BRIEF DESCRIPTION OF THE DRAWINGS

The invention will now be described by way of example only, and with reference to the accompanying drawings in which:

FIG. 1b referred to above shows a truth table generated by the prompt of FIG. 1a;

FIG. 1c referred to above shows conditional text in a partially customised document, generated form the prompt of FIG. 1a;

DESCRIPTION OF PREFERRED EMBODIMENTS

Figure 2:
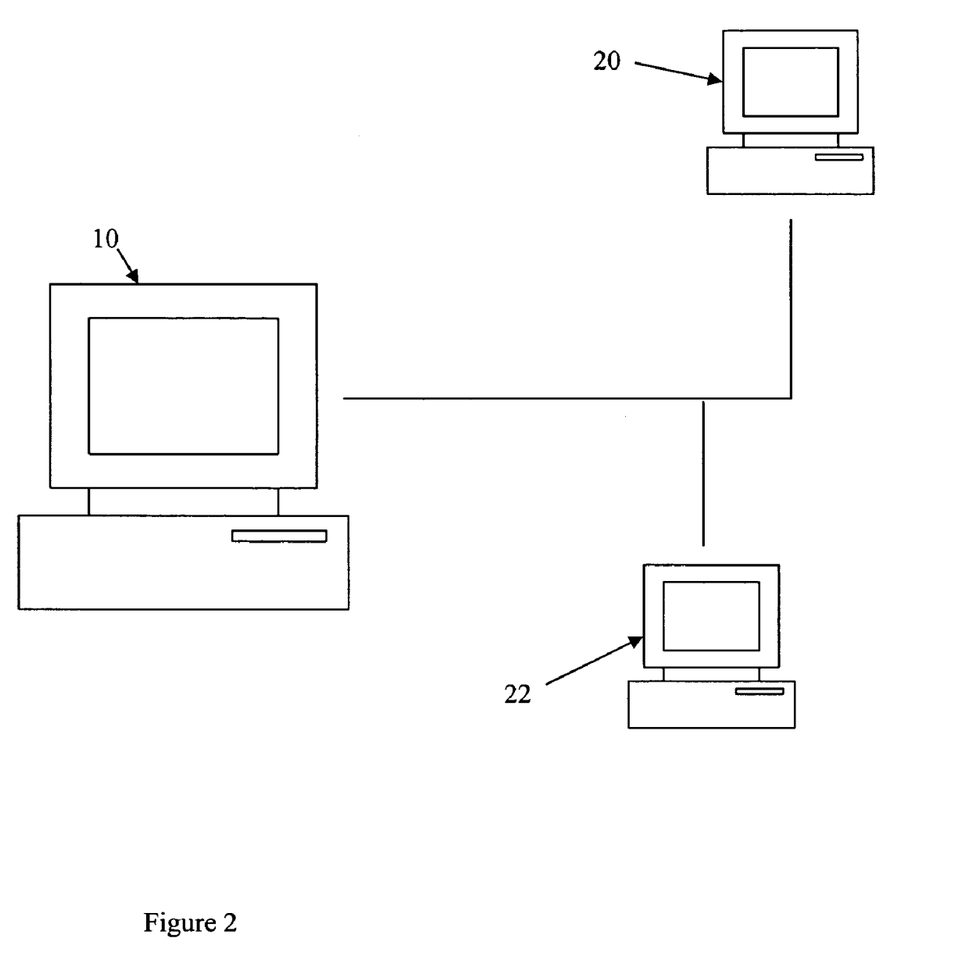
FIG. 2 illustrates a first network system in which embodiments of the invention may be carried out.
Figure 3:
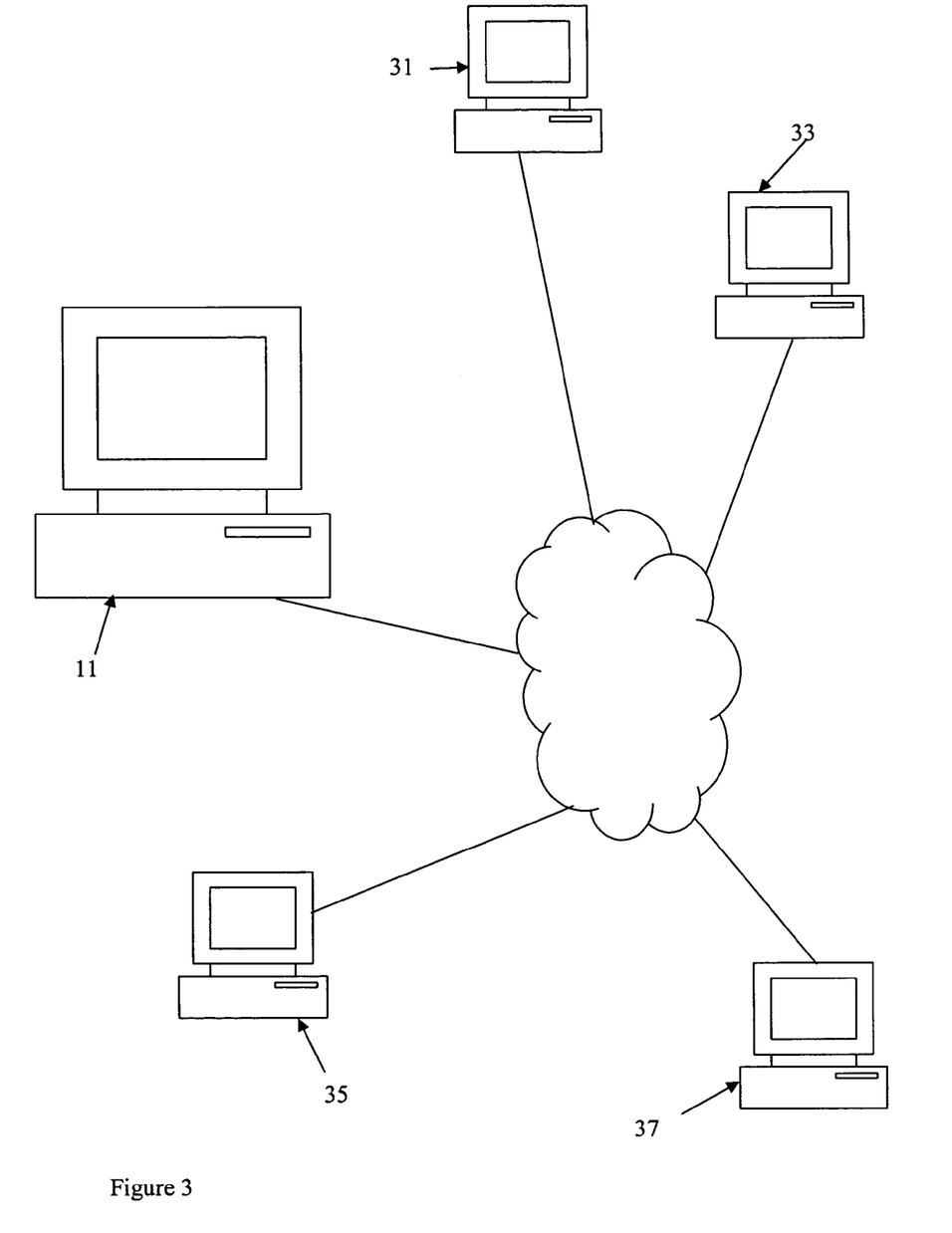
FIG. 3 illustrates a second network system in which embodiments of the invention may be carried out.
Figure 4:
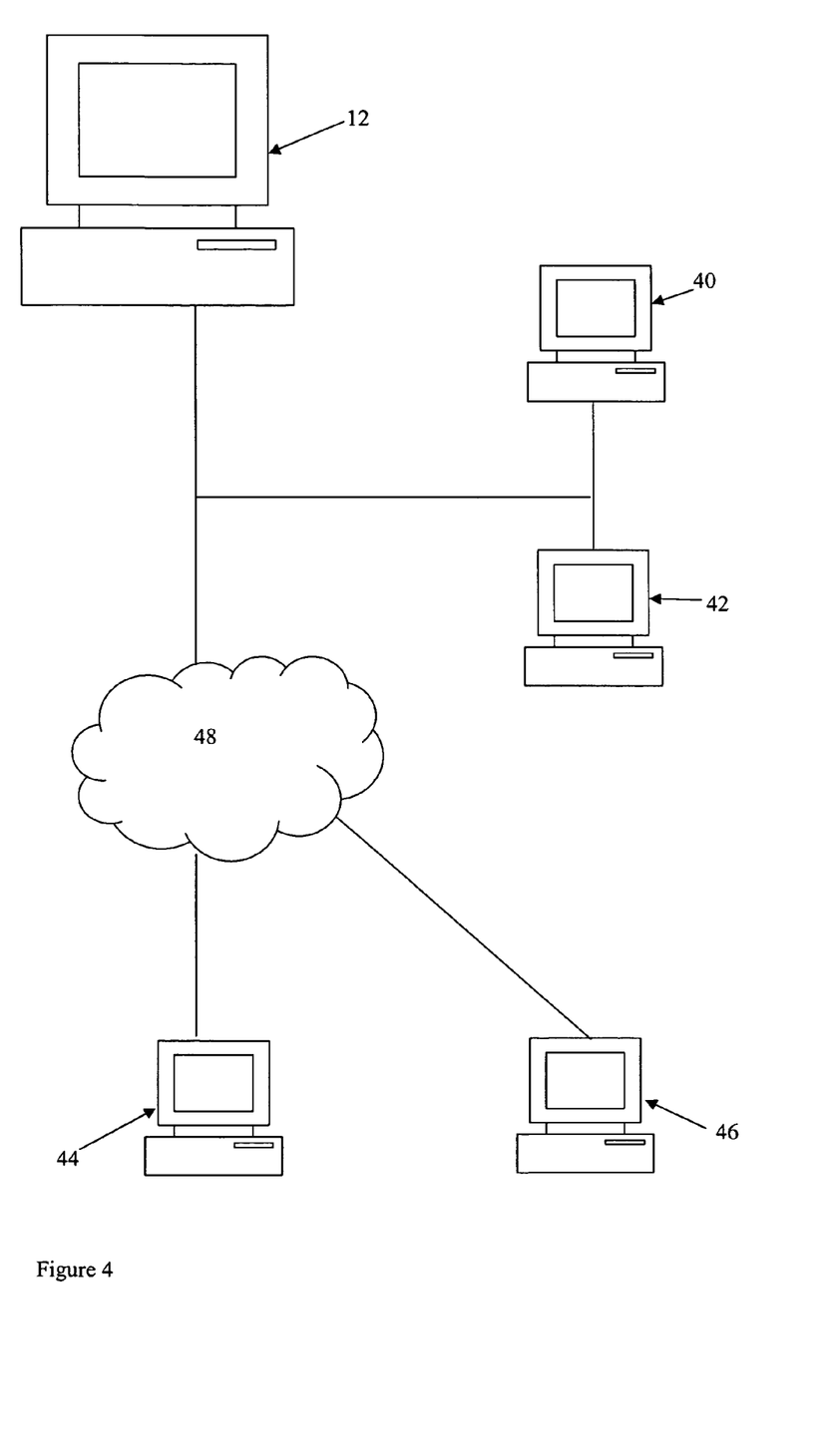
FIG. 4 illustrates a third network system in which embodiments of the invention may be carried out.

The system in which embodiments of the present invention are implemented will now be described. The system comprises one or more data processing means, which, where a plurality of processing means are used, are connected together using communication means. For example, client/server architecture may be used, with one of the data processing means functioning as a server, and others as clients. However, a single processing means may function as both server and client. Various configurations of client/server architecture are shown in FIGS. 2, 3 and 4. The invention is not limited to any particular hardware architecture. For example, the invention could be implemented as a stand alone computer such as, for example, a PC.

FIG. 2 shows a server computer 10 connected to two local client computers 20 and 22, connected by means of a local area network (LAN) 30, forming an intranet. Each computer 10, 20, 22, runs an operating system program, such as Microsoft Windows 2000 Professional™ and network programs such as Novell Netware™. The server computer 10 also runs a Web server application such as Microsoft Internet Information Server™, and each of the local client computers 20, 22 also run a browsing application such as Microsoft Internet Explorer™. The server 10 and local computers 20, 22 communicate using transmission control protocol/internet protocol (TCP/IP) and hypertext transfer protocol (HTTP).

FIG. 3 shows a single server computer 11 connected to four client computers, 31, 33, 35 and 37, using a LAN, each of which runs the operating systems and browser applications mentioned above, and which communicate with the server computer 10 using TCP/IP and HTTP or protocols. It is also possible to use XML or other similar known protocols.

FIG. 4 shows a server computer 12 connected to two local client computers 40 and 42 using a LAN, and also connected to two remote client computers 44 and 46 through the internet 48. Each runs the operating and browser systems mentioned above, and proxy servers and firewalls may be used to protect the intranet from unauthorised access from the internet. Again, communication within the intranet is via TCP/IP and HTTP protocols.

As FIG. 4 is the most general arrangement, embodiments of the invention will be described with respect to such a network.

One or more of the computer systems 12, 40, 42, 44 and 46 runs a word processing application such as Microsoft Word™, which is used to create document templates and may be used to view fully or partially customised documents generated by a document generation system. The document template comprises one or more content elements for possible use when generating a customised document and one or more associated rules for determining, on the basis of further information provided by a user, how to use the content elements (which may be conditional clauses or statements) when generating a customised document.

Server computer 12 also runs a document generation program, which, when provided with a template, generates one or more input forms to capture information from a user, the input forms being generated on the basis of rules contained in the template. The document generation program then generates a fully or partially customised documents on the instructions of a user. The document generation program may be run as a server program and is instructed to perform tasks by users of client browser applications.

To generate either a fully or partially customised document from a template, a user instructs the document generation program by sending URL GET or POST request from a client computer, 40, 42, 44 or 46, to the server 12. The document generation program then initiates a session with the client computer. The document generation program may generate one or more Web input forms based on the chosen template, which are passed via a Web server application to the client computer. This Web input form uses standard HTML (hypertext mark-up language) features such as buttons, free-form entry boxes, tick boxes, pull-down menu list boxes, radio buttons and other graphical user interface (GUI) means for inputting information. The document generation program may generate multiple input forms for distributing to and capturing further information from the users of one or more further client computers 40, 42, 44 46. The document generation program may also produce multiple forms for capturing information from the user of a single client computer in several stages. However, in the following embodiments, it is assumed that only one user of a client computer is involved.

Figure 5:
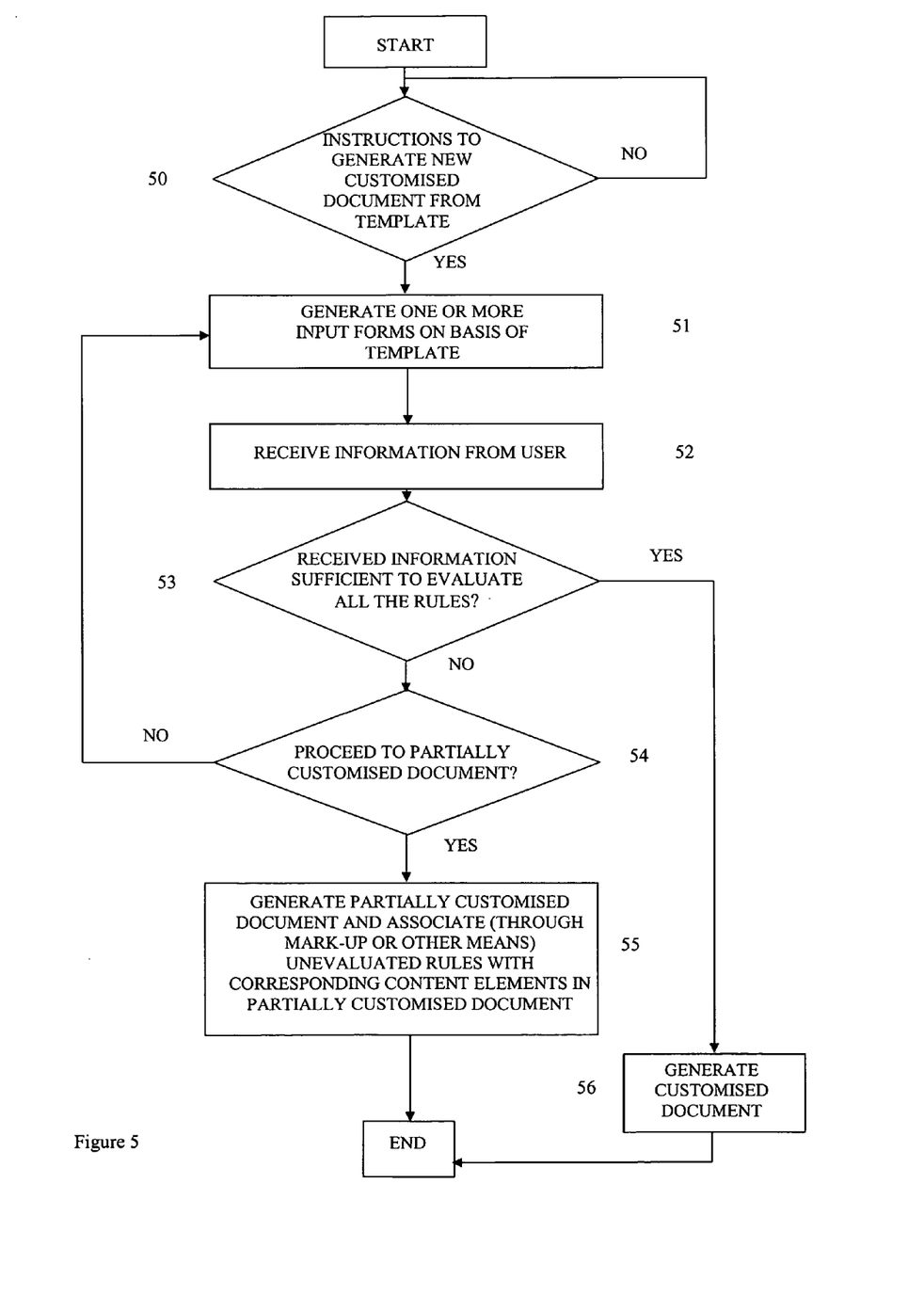
FIG. 5 is a flow diagram showing the stages in producing a customised document.

FIG. 5 is a flow diagram showing the process followed by the document generation program. At step 50, the document generation program waits for an instruction from the user to generate a new customised document from a template. On receiving such an instruction, the document generation program generates, at step 51, a first input form on the basis of the rules contained in the template. The user then enters information, using the input form, which is received by the document generation program at step 52. Then, at step 53, the document generation program determines whether the received information is sufficient to evaluate all the rules. If yes, the process continues to step 56 where the document generation program generates a customised document. If no, then the process continues to step 54, where the document generation program determines whether or not it should proceed to generate a partially customised document. If it should, then the process continues to step 55 where such a document is generated. If there is no request from the user to produce a partially customised document (for example, a tick box on the Web input form has been left blank), then the process returns to step 51, and generates further Web input forms for capturing further information from the user. This process is completed until sufficient information is captured to produce either a fully customised document, or a satisfactory partially customised document.

The customised document contains not only the content elements, the inclusion of which has been determined by the various rules within the template, but also the rules which have not been evaluated. The association between the content elements and rules which have not been evaluated may be represented by means of a mark-up.

However, some of these content elements may be formed of conditional clauses or statements, and may need to contain cross-references which relate to internal or external conditional or non-conditional text, or clause numbers. Content elements containing the same conditional text may be stored externally. As discussed above, for a document generated to be viewed in a word processing package such as Microsoft Word™, it is not possible to use cross-references available through the word processing package in the template or the generated document, as these will be unresolvable.

However, embodiments of the present invention propose a solution to the problems outlined above, which is carried out during assembly of the template. A series of label elements is used to identify conditional clauses within the template, removing the need to use any form of cross-reference. An example of this is shown below. This enables different content elements, whether stored in the same file or in different or external files, to have the same reference.

A typical clause which may be included in a legal document, such as a contract, is a termination clause, which is dependent on the jurisdiction in which the contract is governed. If cross-references could be used, this could be represented in the master document as:

6. Termination
6.1 [This termination clause is used when the jurisdiction is England and Wales.]
6.2 [This termination clause is used when the jurisdiction is Scotland.]

. . . subject to the provisos of clause 6.1.

However, the use of such a cross-reference in the template would result in the following in the fully or, partially generated document:

6. Termination
6.1 This termination clause is used when the jurisdiction is Scotland.

. . . subject to the provision of clause Error! Reference source not found.

The present invention solves this problem by providing a series of label elements for conditional clauses in the template. As an actual cross-reference mechanism is not used, it is possible for several clauses to have the same label element; even if information relating to these clauses are stored in different external files. This is shown in FIG. 6.

Figure 6:
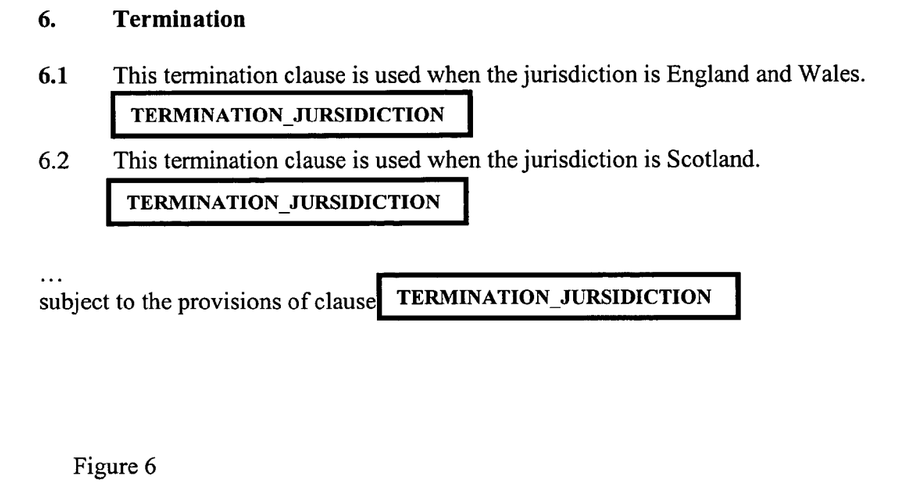
FIG. 6 illustrates a labelling convention.
Figure 7:
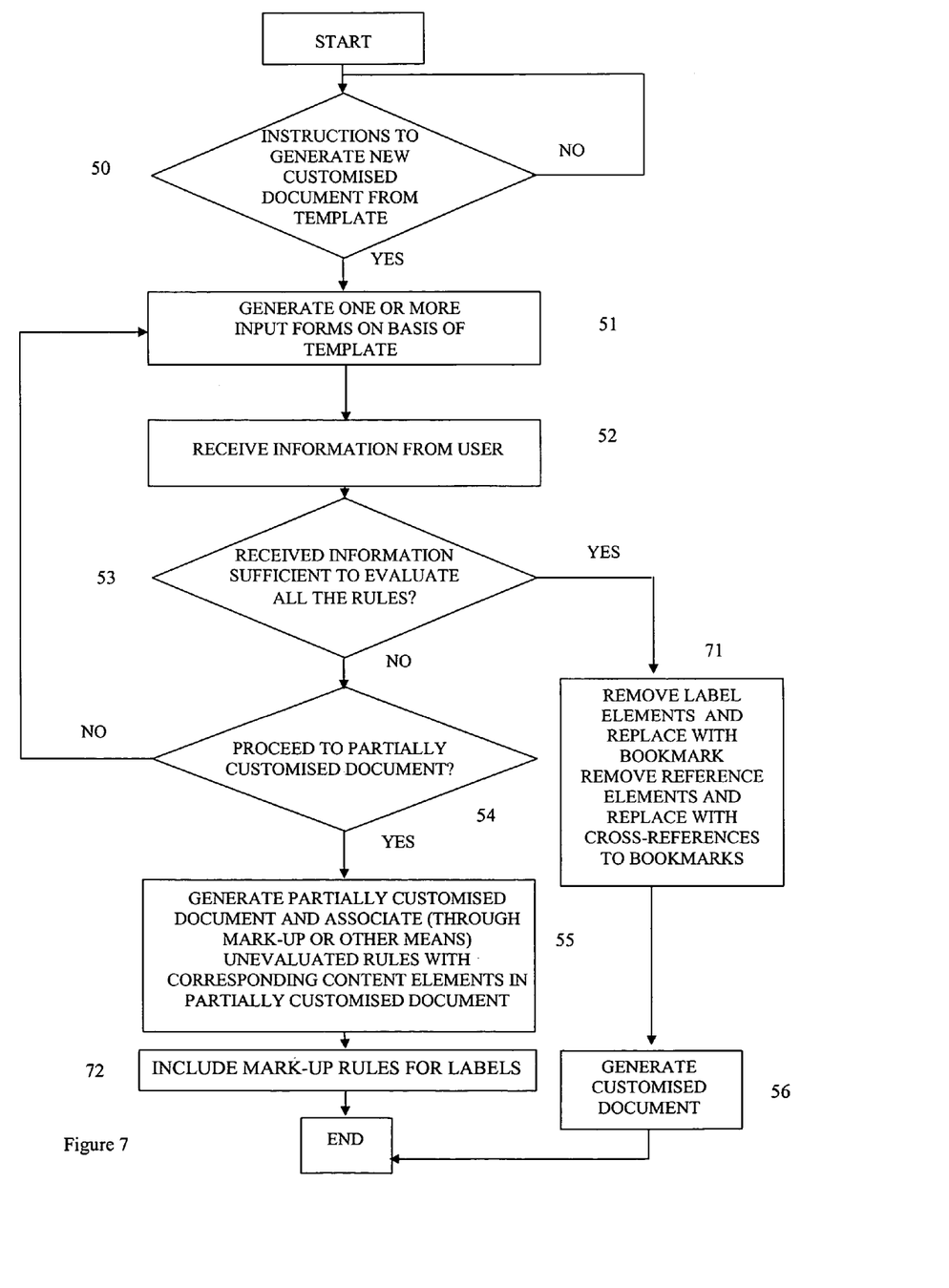
FIG. 7 is a flow diagram showing the stages in producing a customised document containing cross-references.

In FIG. 6, the label element TERMINATION_JURSIDICTION is used to identify clauses which are conditional on the jurisdiction of the contract. A reference element with the same name as the label element is used at the cross-reference point. When the document generation program generates a document from this template, at the point in the assembly when the conditional clauses have been decided upon, the label elements are replaced with a bookmark, for example, a Microsoft Word™ bookmark in the generated document, and the cross-references are replaced with a Microsoft Word™ cross-reference to the appropriate bookmark. This only occurs if a fully customised document is created, since the bookmarks can only be used if each is unique. For this to be true, all conditional or dynamic text behaviour must be removed. If a partially customised document is to be created, then the assembly process stops before the label elements and reference elements are replaced, and the partially customised document is generated which contains the label elements and reference elements, as a marked-up copy. The flow diagram in FIG. 7 illustrates the additional steps necessary in the process of FIG. 5. New step 71 occurs when the document generation program has enough information to create a fully customised document, and involves the removal of all label elements and replacement with bookmarks and the removal of all reference elements and replacement with cross-references to bookmarks. New step 72 occurs when a partially customised document is created, and the mark-up rules include the facility to generate the document with the label elements and reference elements as part of the mark-up.

The clause labels may be marked up within the template in order to be identified as pertaining to particular clauses and cross-references. This may indicate, for example, when a label element is associated with a single, particular clause, or when a label element is associated with a collection of alternative clauses. This is shown below:

6. Termination 6.1 {LABEL TERMINATION_JURISDICTION} [This termination clause is used when the jurisdiction is England and Wales]

6.2 {LABEL TERMINATION_JURISDICTION} [This termination clause is used when the jurisdiction is Scotland]

6.3 {LABEL TERMINATION_SUPPLIER} [This termination clause is used when the supplier is a registered company]

6.4 {LABEL TERMINATION_SUPPLIER} [This termination clause is used when the supplier is an individual or firm]

where { } (curly) brackets are used to mark-up the label element with the word LABEL followed by the name of the label element, and the conditional text to which the label element relates is denoted by [ ] (square) brackets.

It is also possible to mark-up label elements to indicate the clause label to which a cross-reference refers, and to use a reference element to illustrate the style of the cross-reference corresponding to Microsoft Word™ styles. For example, the cross-reference might be marked up using { } (curly) brackets with the word REF followed by the name of the label:

... subject to the provisions of the termination clauses {REF TERMINATION_JURISDICTION and {REF TERMINATION_SUPPLIER}.

... subject to the provisions of the termination clause {REF TERMINATION_JURISDICTION FULL CONTEXT} ON PAGE {REF TERMINATION_JURISDICTION PAGE} {REF TERMINATION_JURISDICTION ABOVE/BELOW}.

Therefore, each marked-up clause label included in the generated document is replaced with a bookmark that spans the whole clause and has the same name as the original label element in the template. Each marked-up reference element which is included in the generated document is replaced with a cross-reference to a bookmark having the same name as the original reference element in the template and the same style of the marked-up reference element.

The use of labelling rather than the use of cross-reference or bookmark functions directly also enables the use of cross-references between files. Furthermore, it is possible to extend the use of labels to clause numbering, thereby removing the need to use automated mechanisms. However, as unique bookmarks are inserted at the assembly stage of a fully customised document, where all conditional text is removed, it is possible to use auto-numbering mechanisms in the customised document after assembly.

Various modifications to the invention, which are within the scope of the appended claims, will be clear to those skilled in the art.

What is claimed is:

1. A document generation system for generating a customised document using a template containing content elements selectable by rules operating on input information, the system comprising
   at least one computer having a document generation program installed thereon, wherein the system generates a fully or a partially customised document by evaluating the rules to select some of the content elements, the system further comprising
   means for enabling the fully or partially customised document to support cross-references between a first content element and at least a second content element,
   wherein the cross-references are created in the template by the document generation program, and are marked-up in the template in the form of reference elements which identify cross-references and label elements which identify conditional clauses; and
   wherein when a fully customised document is generated, the label elements are replaced with electronic bookmarks indicative of locations in the fully customised document, and the reference elements are replaced with cross-references to the bookmarks.

2. The document generation system of claim 1, wherein the at least one computer has an external data file stored thereon.

3. The document generation system of claim 2, wherein the means for enabling the fully or partially customised document is able to support cross-references between a first content element and at least a second content element also enables the document to support cross-references to the external data file.

4. The document generation system of claim 2, wherein of least one of the first or at least one second content elements is stored in the external data file.

5. The document generation system of claim 1, wherein when a partially customised document is generated, the label elements and reference elements are shown as marked-up text.

6. The document generation system of claim 1, wherein the at least one computer is part of a server-client network comprising at least one server computer and at least one client computer.

7. The document generation system of claim 6, wherein the document generation program is stored on the at least one server computer.

8. The document generation system of claim 6, wherein the at least one server computer and the at least one client computer communicate using a communication protocol.

9. The document generation system of claim 8, wherein the communication protocol is at least one of TCP/IP, or HTTP.

10. The document generation system of claim 1, wherein the means to enable the fully or partially customised document to support cross-references between a first content element and at least a second content element is the document generation program.

11. The document generation system of claim 1, wherein the content elements are formed of conditional clauses or statements.

12. The document generation system of claim 1, wherein the first content element and the at least one second content element have a same reference.

13. The document generation system of claim 1, wherein the label elements are used to identify conditional clauses within the template, such that several conditional clauses have a given label element.

14. The document system of claim 1, wherein reference elements corresponding to the label elements are used at a cross-reference point in the template.

15. A document generation system for generating a customised document using a template containing content elements selectable by rules operating on input information, the system comprising:
   at least one server computer having a document generation program installed thereon; and
   at least one client computer, connected to the server computer using a communication protocol, and having a Web browser application and a word processing application stored thereon;
   wherein the at least one of the server and at least one client computers stores information external to the applications stored thereon as an external file;
   and wherein the system generates a fully or a partially customised document by evaluating the rules to select some of the content elements, the system further comprising means to enable the fully or partially customised document to support cross-references between a first content element and at least a second content element, and cross-references between any of the content elements and an external file;
   wherein the cross-references are created in the template by the document generation program, and are marked-up in the template in the form of reference elements which identify cross-references and label elements which identify conditional clauses; and
   wherein when a fully customised document is generated, the label elements are replaced with electronic bookmarks indicative of locations in the fully customised document, and the reference elements are replaced with cross-references to the bookmarks.

16. The document generation system of claim 15, wherein the client computer and server computer communicate using at least one of TCP/IP or HTTP.

17. The document generation system of claim 15, wherein when a partially customised document is created, the label elements and reference elements are shown as marked-up text.

18. The document generation system of claim 15, wherein the means to enable the fully or partially customised document to support cross-references between a first content element and at least a second content element is the document generation program.

19. The document generation program of claim 15, wherein the content elements are formed of conditional clauses or statements.

20. The document generation system of claim 15, wherein at least one of the first or at least one second content elements is stored in the external data file.

21. The document generation system of claim 15, wherein the first content element and the at least one second content element have a same reference.

22. The document generation system of claim 15, wherein the label elements are used to identify conditional clauses within the template, such that several conditional clauses can have a same label element.

23. The document system of claim 15, wherein reference elements corresponding to the label elements are used at a cross-reference point in the template.

24. A document generation system for generating a customised document using a template containing content elements selectable by rules operating on input information, the system comprising at least one computer having a document generation program and at least one file of external data installed thereon, wherein the system generates a fully or a partially customised document by evaluating the rules to select some of the content elements, the system further comprising means for enabling the fully or partially customised document to support cross-references between a first content element and data in the external file;
   wherein the cross-references are created in the template by the document generation program, and are marked-up in the template in the form of reference elements which identify cross-references and label elements which identify conditional clauses; and
   wherein when a fully customised document is generated, the label elements are replaced with electronic bookmarks indicative of locations in the fully customised document, and the reference elements are replaced with cross-references to the bookmarks.

25. The document generation system of claim 24, wherein means to enable the fully or partially customised document to support cross-references between a first content element and data in the external file further enable the fully or partially customised document to support cross-references between at least a first content element and a second content element.

26. The document generation system of claim 24, wherein when a partially customised document is generated, the labels are shown as marked-up text.

27. The document generation system of claim 24, wherein the at least one computer is part of a server-client network comprising at least on server computer and at least one client computer.

28. The document generation system of claim 27, wherein the document generation program is stored on the at least one server computer.

29. The document generation system of claim 27, wherein the at least one server computer and the at least one client computer communicate using a communication protocol.

30. The document generation system of claim 29, wherein the communication protocol is at least one of TCP/IP or HTTP.

31. The document generation system of claim 24, wherein the means to enable the fully or partially customised document to support cross-references between a first content element and at least a second content element is the document generation program.

32. The document generation system of claim 24, wherein the first content element and the at least one second content element have a same reference.

33. The document generation system of claim 24, wherein the label elements are used to identify conditional clauses within the template, such that several conditional clauses have a given label element.

34. The document system of claim 24, wherein reference elements corresponding to the label elements are used at a cross-reference point in the template.

35. The method of claim 24, wherein the label elements are used to identify conditional clauses within the template, such that several conditional clauses have a given label element.

36. A computer program product comprising a computer readable medium having stored thereon program instructions which when run on a computer causes the computer to perform the steps of:
   accessing a template comprising content elements and rules for use when generating a document;

assigning label elements and reference elements to the content elements, to represent cross-references to content elements; wherein the label elements represent conditional clauses and the reference elements represent cross-references;

accessing data associated with the template, the data representing at least one rule for making at least one determination of the use of the content elements;

receiving information enabling at least one determination to be made;

generating a partially or fully customised document on the basis of the received information; and on generation of a fully customised document, replacing each of the label elements with an electronic bookmark and each of the reference elements with a cross-reference to one of the electronic bookmarks, wherein the electronic bookmarks indicative of locations in the fully customised document, and, on generation of a partially customised document, indicating each label element or reference element in a mark-up scheme.

37. The computer program product of claim 36, wherein the label elements are used to identify conditional clauses within the template, such that several conditional clauses have a given label element.

38. The computer program product of claim 36, wherein reference elements corresponding to the label elements are used at a cross-reference point in the template.

39. A document generation system for generating a customised document using a template containing content elements selectable by rules operating an input information, the system comprising at least one computer having a document generation program installed thereon, wherein the system generates a fully or a partially customised document by evaluating the rules to select some of the content elements, the system further comprising means for enabling the fully or partially customised document to support cross references between a first content element and at least a second content element, wherein the content elements are formed of conditional clauses or statements, wherein the cross-references are created in the template by the document generation program, and are marked-up in the template in the form of reference elements which identify cross-references and label elements which identify conditional clauses; and wherein when a fully customised document is generated, the label elements are replaced with electronic bookmarks indicative of locations in the fully customised document, and the reference elements are replaced with cross-references to the bookmarks.

40. The document generation system of claim 39, wherein the at least one computer has an external data file stored thereon.

41. The document generation system of claim 40, wherein at least one of the first and at least one second content elements is stored in the external data file.

42. The document generation system of claim 39, wherein the first content element and the at least one second content element have the same reference.

43. A document generation system for generating a customised document using a template containing content elements selectable by rules operating on input information, the system comprising at least one computer having a document generation program installed thereon, wherein the system generates a fully or a partially customised document by evaluating the rules to select some of the content elements, the system further comprising means for enabling the fully or partially customised document to support cross-references between a first content element and at least a second content element, wherein the first content element and the at least one second content element have the same reference;

wherein the cross-references are created in the template by the document generation program, and are marked-up in the template in the form of reference elements which identify cross-references and label elements which identify conditional clauses; and wherein when a fully customised document is generated, the label elements are replaced with electronic bookmarks indicative of locations in the fully customised document, and the reference elements are replaced with cross-references to the bookmarks.

* * * * *